United States Patent [19]

Turbett

[11] Patent Number: 5,034,278
[45] Date of Patent: * Jul. 23, 1991

[54] TREE RESISTANT COMPOSITIONS

[75] Inventor: Robert J. Turbett, Millington, N.J.

[73] Assignee: Union Carbide Chemicals and Plastics Technology Corporation, Danbury, Conn.

[*] Notice: The portion of the term of this patent subsequent to Jun. 5, 2007 has been disclaimed.

[21] Appl. No.: 365,615

[22] Filed: Jun. 14, 1989

Related U.S. Application Data

[63] Continuation-in-part of Ser. No. 225,217, Jul. 28, 1988, abandoned.

[51] Int. Cl.$^5$ .................................................. B32B 9/06
[52] U.S. Cl. ...................................... 428/450; 428/447; 524/265
[58] Field of Search ................. 524/265; 428/447, 450

[56] References Cited

U.S. PATENT DOCUMENTS

| | | | |
|---|---|---|---|
| 3,795,646 | 3/1974 | MacKenzie et al. | 260/29.1 SB |
| 3,870,766 | 3/1975 | Chadha | 260/825 |
| 3,936,572 | 2/1976 | MacKenzie et al. | 428/379 |
| 4,302,565 | 11/1981 | Goeke et al. | 526/125 |
| 4,481,322 | 11/1984 | Godlewski et al. | 524/265 |
| 4,535,113 | 8/1985 | Foster et al. | 524/262 |
| 4,689,362 | 8/1987 | Dexter | 524/266 |
| 4,708,082 | 10/1987 | Godlewski | 524/731 |
| 4,931,492 | 6/1990 | Foster et al. | 524/267 |

FOREIGN PATENT DOCUMENTS 3702209  8/1988  Fed. Rep. of Germany.

*Primary Examiner*—Melvyn I. Marquis
*Attorney, Agent, or Firm*—Saul R. Bresch

EXEMPLARY CLAIM

1. A composition comprising:
   (a) a homopolymer of ethylene having a density in the range of about 0.915 to about 0.925 gram per cubic centimeter and a melt index in the range of 0.1 to about 5 grams per 10 minutes or a copolymer of ethylene and one or more alpha-olefins, each having 3 to 8 carbon atoms, said copolymer having a density in the range of about 0.880 to about 0.915 grams per cubic centimeter and a melt index in the range of about 0.1 to about 10 grams per 10 minutes; and p1 (b) a polysiloxane having the formula:

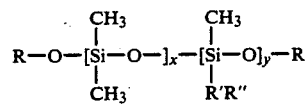

wherein:
   R = alkyl having 1 to 4 carbon atoms, acyl having 1 to 4 carbon atoms, or trimethyl silyl, and each R is alike or different
   R' = alkyleneoxy having 3 to 11 carbon atoms
   R" = hydrogen or alkylhydroxy having 3 carbon atoms and 2 hydroxyl groups.
   x = about 2 to about 20
   y = about 2 to about 20, and the hydroxyl content of the composition is at least about 0.15 percent by weight based on the total weight of the composition.

17 Claims, No Drawings

TREE RESISTANT COMPOSITIONS

This application is a continuation-in-part of application Ser. No. 225,217 filed on July 28, 1988 and now abandoned.

TECHNICAL FIELD

This invention relates to compositions which are useful in low to high voltage insulation because of their resistance to water trees.

BACKGROUND ART

Power cables insulated with extruded dielectrics are known to suffer from shortened life when installed underground where water contact is likely. The shortened life has been attributed to the formation of water trees, which occur when an organic polymeric material is subjected to an electrical field over a long period of time in the presence of water in liquid or vapor form. The net result is a reduction in the dielectric strength of the insulation.

Many solutions have been proposed for increasing the resistance of organic insulating materials to degradation by water treeing. These include, for example, the addition to polyethylene of (i) a polar copolymer such as a copolymer of ethylene and vinyl acetate; (ii) a voltage stabilizer such as dodecanol; and (iii) a filler, e.g., clay. These solutions all have shortcomings of some kind such as an increaser in dielectric loss, i.e., the power factor or volatility.

DISCLOSURE OF THE INVENTION

An object of this invention, therefore, is to provide a water tree resistant composition adapted for use in low to high voltage insulation, which does not depend on the use of those modifying additives, known to increase dielectric loss or volatility, to achieve acceptable treeing resistance.

Other objects and advantages will become apparent hereinafter.

According to the present invention, the above object is met by a water tree resistant composition comprising:

(a) a homopolymer of ethylene having a density in the range of about 0.915 to about 0.925 gram per cubic centimeter and a melt index in the range of 0.1 to about 5 grams per 10 minutes or a copolymer of ethylene and one or more alpha-olefins, each having 3 to 8 carbon atoms, said copolymer having a density in the range of about 0.880 to about 0.915 gram per cubic centimeter and a melt index in the range of about 0.1 to about 10 grams per 10 minutes; and (b) a polysiloxane having the formula:

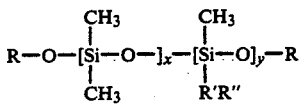

wherein
R = alkyl having 1 to 4 carbon atoms, acyl having 1 to 4 carbon atoms, or trimethyl silyl, and each R is alike or different
R' = alkyleneoxy having 3 to 11 carbon atoms
R" = hydrogen or alkylhydroxy having 3 carbon atoms and 2 hydroxyl groups
x = about 2 to about 20
y = about 2 to about 20, and
the hydroxyl content of the composition is at least about 0.15 percent by weight based on the total weight of the composition.

DETAILED DESCRIPTION

The homopolymer of ethylene can be prepared by the conventional high pressure process described in the Introduction to Polymer Chemistry, Stille, Wiley and Sons, New York, 1962, at pages 149 to 151. The density of the homopolymer is in the range of about 0.915 to about 0.925 gram per cubic centimeter. The melt index, as determined under ASTM D-1238, Condition E (measured at 190° C.), is in the range of about 0.1 to about 5 grams per 10 minutes and is preferably in the range of about 1 to about 3 grams per 10 minutes.

The copolymer of ethylene and one or more alpha-olefins, each having 3 to 8 carbon atoms, has a density in the range of about 0.880 to about 0.915 gram per cubic centimeter and a melt index in the range of about 0.1 to about 10 grams per 10 minutes, preferably about 1 to about 5 grams per 10 minutes. The copolymer can be produced in the presence of a catalyst system containing chromium and titanium or a catalyst system containing a catalyst precursor comprising magnesium, titanium, a halogen, and an electron donor together with one or more aluminum containing compounds. The former can be made in accordance with the disclosure of U.S. Pat. No. 4,101,445 and the latter, which is preferred, can be prepared as described in U.S. Pat. No. 4,302,565.

Suitable alpha-olefin comonomers are exemplified by propylene, 1-butene, 1-hexene, 4-methyl-1-pentene and 1-octene. The portion of the copolymer attributed to the comonomer, other than ethylene, is in the range of about 5 to about 50 percent by weight based on the weight of the copolymer and is preferably in the range of about 10 to about 40 percent by weight.

The polysiloxanes useful in the practice of the invention are organomodified polydimethyl siloxanes. They have the following formula:

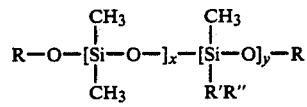

wherein
R = alkyl having 1 to 4 carbon atoms, acyl having 1 to 4 carbon atoms, or trimethyl silyl, and each R is alike or different
R' = alkyleneoxy having 3 to 11 carbon atoms
R" = hydrogen or alkylhydroxy having 3 carbon atoms and 2 hydroxyl groups.
x = about 2 to about 20
y = about 2 to about 20

A preferred polysiloxane has a molecular weight of less than about 3000; R = trimethyl silyl; R'R" = CH$_2$CH$_2$CH$_2$OH or CH$_2$CH$_2$CH$_2$OCH$_2$CH(OH)CH$_2$OH; x+y = about 10 to about 20; and x/y = about 1:1. In specific embodiments, x = 5 or 10 and y = 5 or 10.

A process for preparing polysiloxanes is described in U.S. Pat. No. 4,535,113. Compounds, which can be used to provide the pendant moiety of subject polysiloxane, are exemplified by the preferred 3-allyloxy-1,2- propanediol, allyl glycidyl ether followed by hydrolysis, allyl alcohol, and undecylenyl alcohol.

The polysiloxane component can be present in the composition in an amount ranging from about 0.01 to about 3 parts by weight of polysiloxane per 100 parts by weight of component (a) and is preferably present in an amount of at least about 1 part by weight per 100 parts by weight of component (a).

The hydroxyl content of the polysiloxane is in the range of about 5 to about 12 percent by weight based on the weight of the polysiloxane and is preferably in the range of about 8 to about 12 percent by weight.

The hydroxyl content of the composition is at least about 0.15 percent by weight based on the total weight of the composition and is preferably in the range of about 0.15 to about 0.3 percent by weight. The hydroxyl content of the composition is preferably provided by the polysiloxane.

The homopolymer or copolymer of ethylene can be advantageously blended with (i) ethylene copolymers or terpolymers wherein at least one comonomer is a vinyl acid, a vinyl acid ester, or a vinyl ester of an organic acid; (ii) ethylene terpolymers based on alpha-olefins having 3 to 8 carbon atoms; (iii) ethylene/propylene rubbers; (iv) ethylene/propylene/diene monomer rubbers; (v) hydrolyzable graft polymers produced by grafting silane to any of items (i) to (iv); or (vi) ethylene/hydrolyzable silane copolymers.

The ethylene/silane copolymer can be prepared by the process described in U.S. Pat. No. 3,225,018 and the terpolymer by the process described in U.S. Pat. No. 4,291,136. The weight ratio of ethylene homopolymer or copolymer to added copolymer is usually in the range of about 3:1 to about 1:3. If polar copolymers such as ethylene/vinyl acetate or ethylene/ethyl acrylate are used in the blend, the concentration of the polar comonomer should be kept at low levels to avoid high dielectric losses, e.g., less than about 10 percent by weight of the blend.

The ethylene homopolymer or copolymer can also be grafted with a vinyl trialkoxy silane such as vinyl trimethoxy silane, or ethylene and/or the above mentioned comonomers can be copolymerized with the silane using conventional high pressure techniques thus providing hydrolyzable copolymers.

A free radical generator or catalyst, as well as one or more antioxidants, are generally included in the water tree resistant composition or the polysiloxane composition which is added to it. The function of these free radical generators is to cure the ethylene homopolymer or copolymer. Among the most useful free radical generators are dicumyl peroxide, lauroyl peroxide, azobisisobutyronitrile, benzoyl peroxide, tertiary butyl perbenzoate, di(tertiary-butyl) peroxide, cumene hydroperoxide, 2,5-dimethyl-,5-di(t-butyl- peroxy) hexyene, 2,5-dimethyl-2,5-di(t-butylperoxy)- hexane, tertiary butyl hydroperoxide, and isopropyl percarbonate. The organic peroxides are preferred. About 0.01 to about 5 percent by weight of free radical generator based on the weight of the polymer is used, and preferably about 0.05 to about 3 percent by weight.

Various conventional additives can be added in conventional amounts to the insulation compositions. Typical additives are fillers including carbon black and aluminum silicate, halogen scavengers, processing aids, e.g., metal carboxylates, viscosity control agents, ultraviolet absorbers, antistatic agents, pigments, slip agents, fire retardants, stabilizers, smoke inhibitors, cross-linking boosters, lubricants, and plasticizers.

Wire and cable is generally constructed of a metal conductor insulated with a polymeric material. In cable, these elements are usually twisted to form a core and are protected by another polymeric sheath or jacket material. In certain cases, added protection is afforded by inserting a wrap between the core and the sheath. Subject composition is typically used as the insulating or jacketing layer, and is coated on or extruded about the electrical conductor. The hydrolyzable composition is generally cross-linked after it is in place on the wire or cable.

The publications and patents mentioned in this specification are incorporated by reference herein.

The invention is illustrated by the following examples.

EXAMPLES 1 TO 4

The resistance of insulating compositions to water treeing is determined by the method described in U.S. Pat. No. 4,144,202. This measurement leads to a value for water treeing resistance relative to a standard polyethylene insulating material. The term used for the value is "water tree growth rate" (WTGR). From experience in laboratory tests of materials and for accelerated tests of cables, it has been established that the value for WTGR should be equal to or less than about 10 percent of the standard to provide a useful improvement in cable performance, i.e., in the life of a cable which is in service and in contact with water during the period of service.

The formulation used in the examples is as follows:

| Component | Percent by Weight |
| --- | --- |
| ethylene homopolymer having a melt index of 2 grams per 10 minutes and a density of 0.922 gram per cubic centimeter | balance |
| phenolic antioxidant: thiodiethylene bis-(3,5-di-tert butyl-4-hydroxy hydrocinnamate | 0.2 |
| secondary antioxidant: distearylthiodipropionate | 0.3 |
| polysiloxane | 2.0 |
| dicumyl peroxide | 1.7 to 2.0 |

The polyethylene is a homopolymer of ethylene prepared by the high pressure technique referred to above.

The polysiloxane has the structural formula set forth above wherein R=trimethyl silyl. R', R", x, and y can be found below.

The formulations (NOTE: there is no polysiloxane in the Example 1 formulation) are mixed in a Brabender mixer at about 120° C., formed into WTGR test specimens by compression molding followed by crosslinking in the press. Specimens are vacuum treated for seven days at 80° C. before the WTGR test to remove peroxide residues.

Variables and results are set forth in the Table I below.

TABLE I

| Example | R' | R" | x | y | Polysiloxane OH Content (%) | Formulation OH Content (%) | WTGR (%) |
|---|---|---|---|---|---|---|---|
| 1 | — | — | — | — | — | — | 100 |
| 2 | C3H6O | H | 13 | 5.5 | 5.3 | 0.106 | 19 |
| 3 | C3H6O | H | 10 | 10 | 8.2 | 0.164 | 5 |
| 4 | C3H6O | * | 5 | 5 | 11.4 | 0.228 | 6 |

*CH2CHOHCH2OH

EXAMPLES 5 AND 6

Example 4 is repeated using the following formulations:

|  | Example 5 | Example 6 |
|---|---|---|
|  | (percent by weight) | |
| ethylene/1-hexene copolymer having a melt index of 4 g/10 min and and a density of 0.905 g/cc prepared with a Ti/Mg based catalyst | balance | balance |
| phenolic antioxidant (as in example 4) | 0.2 | — |
| phenolic antioxidant: 4,4'-di/tri thiobis · 2,6-di-tert-butylphenol) | — | 0.2 |
| distearyl thio dipropionate | 0.3 | 0.3 |
| calcium stearate | 0.1 | 0.1 |
| lauryl methacrylate (scorch inhibitor) | — | 0.75 |
| m-phenylene bismaleimide (cure booster) | — | 0.5 |
| dicumyl peroxide | 2.0 | 2.0 |
| polysiloxane (as in example 4) | — | 2.0 |

The results are set forth in Table II below:

TABLE II

| Example | WTGR (%) |
|---|---|
| 5 | 2.2 |
| 6 | 0.07 |

I claim:

1. A composition comprising:
(a) a homopolymer of ethylene having a density in the range of about 0.915 to about 0.925 gram per cubic centimeter and a melt index in the range of 0.1 to about 5 grams per 10 minutes or a copolymer of ethylene and one or more alpha-olefins, each having 3 to 8 carbon atoms, said copolymer having a density in the range of about 0.880 to about 0.915 gram per cubic centimeter and a melt index in the range of about 0.1 to about 10 grams per 10 minutes; and
(b) a polysiloxane having the formula:

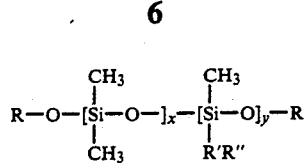

wherein:
R = alkyl having 1 to 4 carbon atoms, acyl having 1 to 4 carbon atoms, or trimethyl silyl, and each R is alike or different
R' = alkyleneoxy having 3 to 11 carbon atoms
R" = hydrogen or alkylhydroxy having 3 carbon atoms and 2 hydroxyl groups
x = about 2 to about 20
y = about 2 to about 20, and
the hydroxyl content of the composition is at least about 0.15 percent by weight based on the total weight of the composition.

2. The composition of claim 1 wherein the polysiloxane is present in an amount of about 0.01 to about 3 parts polysiloxane per 100 parts by weight of polymer.

3. The composition of claim 2 wherein the polysiloxane is present in an amount of at least about 1.0 part by weight.

4. The composition of claim 1 wherein component (a) is a homopolymer of ethylene.

5. The composition of claim 1 wherein component (a) is a copolymer of ethylene and one or more alpha-olefins.

6. The composition of claim 1 and at least one antioxidant and an organic peroxide.

7. The composition of claim 6 and a metal carboxylate.

8. The composition of claim 1 wherein
R = trimethyl silyl
x = 5
Y = 5

9. The composition of claim 1 wherein:
R = trimethyl silyl
x = 10
y = 10

10. The composition of claim 1 wherein the homopolymer or copolymer are crosslinked.

11. The composition of claim 6 wherein the homopolymer or copolymer are crosslinked.

12. An electrical conductor coated with, or having extruded thereabout, the composition of claim 1 wherein the homopolymer or copolymer are in a crosslinked state.

13. An electrical conductor coated with, or having extruded thereabout, the composition of claim 6.

14. A cable comprising a metal core conductor and at least one layer surrounding the core comprising the composition of claim 1 wherein the homopolymer or copolymer are in a crosslinked state.

15. The conductor of claim 13 wherein the homopolymer or copolymer are in a crosslinked state.

16. The composition of claim 1 wherein the hydroxyl content of the composition is in the range of about 0.15 to about 0.3 percent by weight.

17. The composition of claim 1 wherein R'R" is CH2CH2CH2OH or C3H6OCH2CH(OH)CH2OH.

* * * * *